March 7, 1967   J. E. ROBERTSON   3,307,857
BALL HITCH CONSTRUCTION
Filed June 14, 1966

INVENTOR.
JESSE E. ROBERTSON

BY Kimmel & Crowell
ATTORNEYS.

United States Patent Office 3,307,857
Patented Mar. 7, 1967

3,307,857
BALL HITCH CONSTRUCTION
Jesse E. Robertson, Central National Bank, % Clyde
Vinson, San Angelo, Tex. 76901
Substituted for abandoned application Ser. No. 368,889,
May 20, 1964. This application June 14, 1966, Ser.
No. 562,058
6 Claims. (Cl. 280—511)

This invention relates to a ball hitch construction and more particularly to a variably sized male portion of a ball hitch construction.

As conducive to a better understanding of the instant invention, ball hitch constructions are well known wherein a male hitch member is carried by a first element and a female hitch member is carried by a second element, the female hitch member being engageable over the male hitch member to removably secure the first and second elements to each other. Such hitch constructions are conventionally used in carrying a trailer or the like behind an automobile. The female hitch members carried by trailers or the like are not uniform in size, thereby requiring heretofore a plurality of male hitch members to ensure proper cooperation between the portions of the hitch construction.

A primary object of this invention is to provide a ball hitch construction which is free from the foregoing, and other disadvantages.

Another object of this invention is the provision of a male hitch member which includes means to vary its effective size to accommodate female hitch members of different dimensions.

A further object of the instant invention is the provision of a male hitch member including portions defining a ball, the diameter of the ball being readily varied depending upon the size of the female hitch member with which it is to be utilized.

A still further object of this invention is the provision of a device of the type described which may be quickly disassembled and reassembled to form a ball of a different effective size.

Yet another object of this invention is to provide an adjustable male hitch member for a ball hitch construction which will not become accidentally disassembled or disengaged during use.

A further object of the instant invention is the provision of such a device which is sturdy and durable in construction, reliable and efficient in operation, and relatively simple and inexpensive to manufacture, assemble, utilize and maintain.

Other and further objects reside in the combination of elements, arrangement of parts, and features of construction.

Still other objects will in part be obvious and in part be pointed out as the description of the invention proceeds and as shown in the accompanying drawing wherein.

Similar reference characters refer to similar parts throughout the several views of the drawing.

Figure 2:
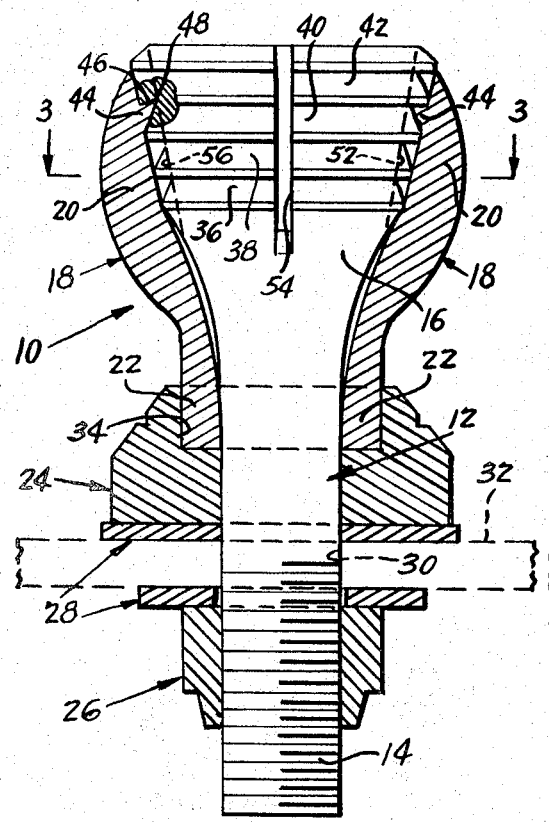
FIGURE 2 is a vertical cross-sectional view therethrough.
Figure 1:
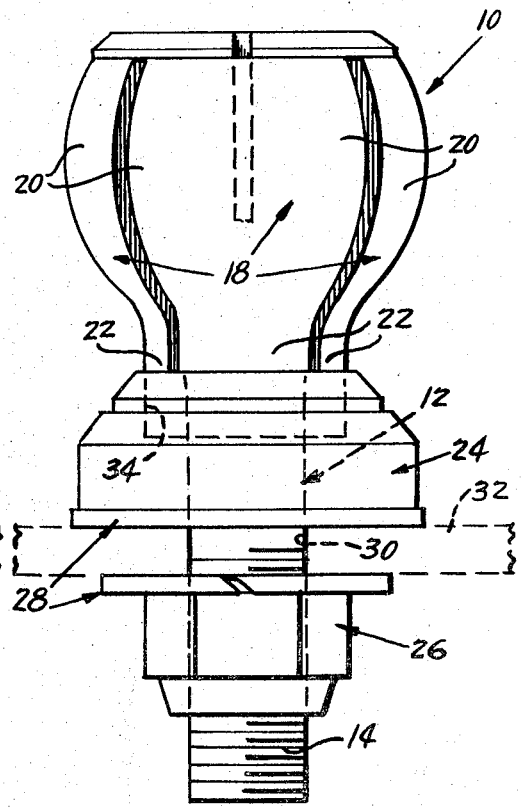
FIGURE 1 is a side elevational view of a male hitch member in accordance with the instant inventive concept, the element by which it is carried and certain hidden parts being shown in dotted lines.
Figure 3:
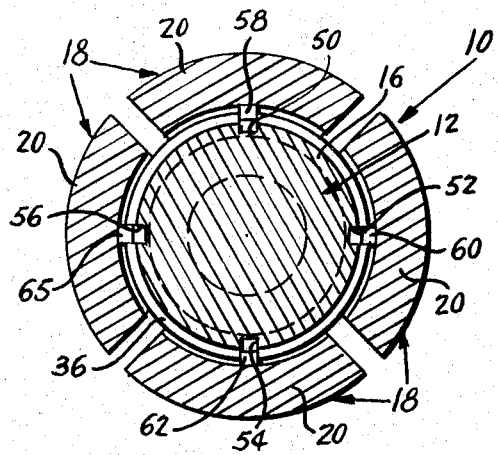
FIGURE 3 is a transverse cross-sectional view taken substantially on line 3—3 of FIGURE 2.

Referring now to the drawing, a male hitch member for a ball hitch construction in accordance with the instant inventive concept is designated generally by the reference numeral 10 and comprises basically a stem element 12 having a threaded shank portion 14 at one end and a frusto-conical portion 16 at its opposite end, a plurality of segmental elements 18 having bulbous portions 20 together defining a ball and elongated end portions 22 together defining a cylinder, a collar means 24, a nut means 26, and washer members 28.

The shank portion 14 of the stem element 12 passes through an aperture 30 in an element 32 such as the tongue of a trailer hitch (not shown) or the like. The washer members 28 are interposed on opposite sides of the element 32 between the collar means 24 and the nut means 26.

The collar means 24 includes portions defining a cylindrical recess 34 for receiving the end portions 22 of the segmental elements 18, thereby holding these elements in related assembly.

The stem element 12 includes portions defining a plurality of sizing notches 36, 38, 40, and 42 axially spaced about the periphery of the frusto-conical portion 16 of the same. Each of the segmental elements 18 include a sizing detent 44 engaged in a selected sizing notch to determine the effective size of the ball defined by the bulbous portions 20 of the segmental elements 18. The portions of the stem element defining the sizing notches 36, 38, 40, and 42 preferably define a notched surface 46 shown in the broken away portion of FIGURE 2, which is remote from the shank portion 14 of the stem element 12 and which extends radially inwardly and axially away from the shank portion 14, the sizing detents 44 including an edge 48 which comates with the surface 46 to preclude accidental disengagement between the segmental elements 18 and the stem element 12.

A plurality of peripherally spaced, axially extending keyways 50, 52, 54, and 56 are defined in the frusto-conical portion 16 of the stem element 12 and comate with corresponding keys 58, 60, 62, and 64 carried by each of the segmental elements 18 to preclude relative rotation between the segmental elements and the stem element 12.

Each element of the device of the instant invention may be formed of any desired material, preferably a heavy metal or the like, and it will be readily seen that many of the elements may be modified while still performing the same function. For example, the frusto-conical portion 16 of the stem element 12 may be in the form of a frustum of a pyramid, if desired, thereby precluding the necessity of the keys and keyways to prevent relative rotation between the segmental elements and the stem element. Similarly, although only four segmental elements have been shown, it will be seen that less or more segmental elements may be used.

Figure 4:
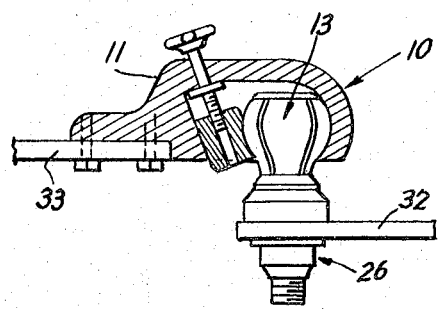
FIGURE 4 is a reduced elevational view partly in section, showing the connection of the adjustable male hitch member with a female hitch member.

The use and operation of the device of the instant invention will now be apparent. The shank portion 14 of the stem element 12 is passed through the collar means 24, the upper washer member 28, the aperture 30 in the element 32, the lower washer member 28 which is shown as a split ring, and the nut means 26 is loosely threaded thereon. The end portions 22 of the segmental elements 18 are inserted into the cylindrical recess 34 of the collar means 24 and the sizing detents 44 are engaged in a selected sizing notch 36, 38, 40, or 42 to provide a ball defined by the bulbous portions 20 of a predetermined size. The nut means 26 is then tightened until the segmental elements 18 are securely locked in position by the collar means 24 and the comating of the sizing detents with the selected sizing notch. A female hitch member 11 (see FIG. 4), carried by a second hitch element 33, is then engaged over the ball in a well known manner.

The effective size of the ball may be readily varied by loosening the nut means 26 and re-engaging the sizing detents 44 in a different sizing notch thereby either increasing or decreasing the outer dimension of the bulbous portions 20 of the segmental elements 18.

It will now be seen that there is herein provided an improved ball hitch construction which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. In a ball hitch construction having a male hitch member carried by a first hitch element and a female hitch member carried by a second element and engageable over said male hitch member removably to secure said first and second elements to each other, said male hitch member including a stem element having a shank portion at one end and a frusto-conical portion at its opposite end, said frusto-conical portion tapering to an enlarged end remote from said shank portion, means to secure said shank portion of said stem element to said first element, a plurality of segmental elements having bulbous portions together defining a ball, and means to secure said segmental elements to said stem element at a selected position on said frusto-conical portion whereby the effective size of said ball may be varied.

2. The structure of claim 1 wherein said means to secure said shank portion of said stem element to said first element includes threads defined on the end of said shank portion remote from said frusto-conical portion, nut means received on said threads on one side of said first element, and collar means received on said shank portion adjacent said frusto-conical portion on the opposite side of said first element, said collar means abuttingly engaging said segmental elements to limit the movement of said collar means on said shank portion of said stem element when said nut means is tightened.

3. The structure of claim 2 wherein said means to secure said segmental elements to said stem element includes elongated end portions on said segmental elements together defining a cylinder when said bulbous portions together define said ball, and portions of said collar means defining a cylindrical recess receiving said end portions of said segmental elements and thereby holding said segmental elements in related assembly.

4. The structure of claim 3 further including portions of said stem element defining a plurality of sizing notches axially spaced about the periphery of said frusto-conical portion, and a sizing detent carried by each of said segmental elements, said sizing detents being engaged with a selected sizing notch to determine the effective size of said ball.

5. The structure of claim 4 wherein said portions of said stem element defining each of said sizing notches define a notch surface remote from said shank portion and extending radially inwardly and axially away from said shank portion, each of said sizing detents including an edge comating with said surface of the selected sizing notch to preclude accidental disengagement of said segmental elements and said stem element.

6. The structure of claim 4 further including a plurality of peripherally spaced, axially extending keyways defined in said frusto-conical portion of said stem element, and a corresponding key carried by each segmental element for engagement in one of said keyways.

References Cited by the Examiner

UNITED STATES PATENTS

| | | | |
|---|---|---|---|
| 831,464 | 9/1906 | O'Leary | 85—76 |
| 1,889,297 | 11/1932 | Russell | 280—511 |
| 3,139,291 | 6/1964 | Geresy | 280—507 |

BENJAMIN HERSH, *Primary Examiner.*

C. C. PARSONS, *Assistant Examiner.*